Bailey & Blanchard.

Washing Mach.

No. 3,613. Reissued Aug. 24, 1869.

Witnesses

Jno. A. Ellis

A. Norris

Inventor

J. Bailey & W. H. Blanchard

Per

J. H. Alexander

Atty.

UNITED STATES PATENT OFFICE.

T. BAILEY AND VIRGIL W. BLANCHARD, OF BRIDPORT, VERMONT.

IMPROVED WASHING-MACHINE.

Specification forming part of Letters Patent No. 87,617, dated March 9, 1869; Reissue No. 3,613, dated August 24, 1869.

*To all whom it may concern:*

Be it known that we, T. BAILEY and VIRGIL W. BLANCHARD, of Bridport, State of Vermont, have invented new and useful Improvements in Washing-Machines; and we do hereby declare that the following is an exact description thereof, reference being had to the accompanying drawings, &c., forming a part of this specification, and in which—

Figure 1:
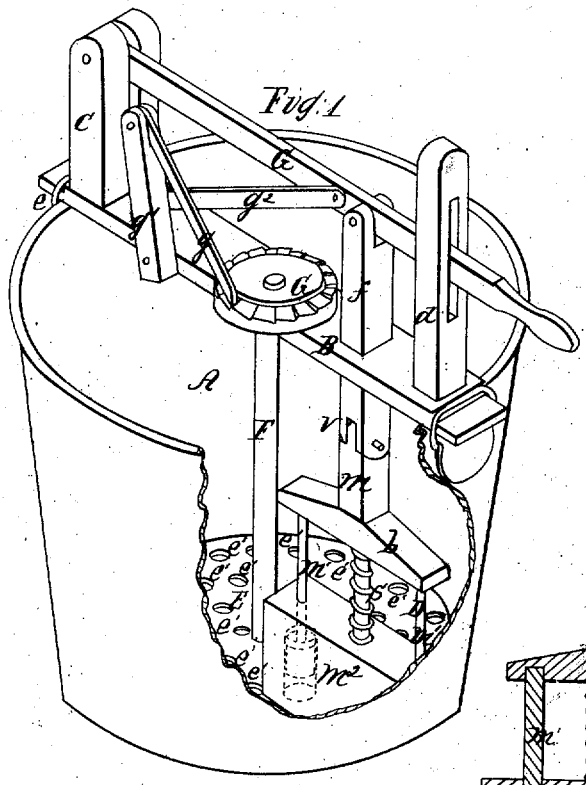
Figure 3:
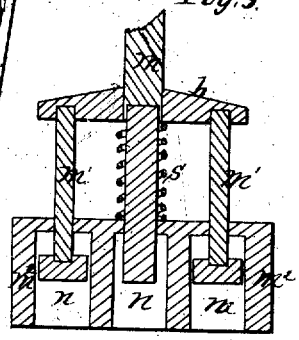
Figure 2:
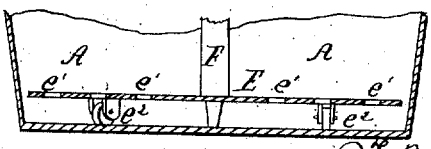

Figure 1 represents a perspective view; Fig. 2, a longitudinal section of the diaphragm, showing the rollers of our washing-machine; and Fig. 3, a longitudinal section of the clothes-pounder.

Similar letters of reference indicate like parts in all the figures.

Our invention consists in the employment in washing-machines of a perforated diaphragm, which may revolve on rollers, in combination with a clothes-pounder, substantially in the manner hereinafter described.

To enable others skilled in the art to which our invention appertains to make and use the same, we will now describe its construction and operation.

In the accompanying drawings, A represents the tub, upon which is secured or placed the bar or support B, secured thereto by means of clips *e e*.

*c* represents a standard, mortised into the bar or support B at one end and provided at its upper end with a slot, into which is pivoted the lever C, having its opposite end through a slotted upright bar or standard, *d*, secured to the support B, and also provided with a handle, by which it may be operated.

*f* is another standard, to which is pivoted the lever C, the lower end of which is hinged to the bar *m*, made rounding on its lower portion, and provided thereat with a spiral spring, *s*, to be referred to hereinafter.

D is the spring clothes-pounder, which consists of the shoulder or cross piece *b*, through which passes the bar *m*, it also being secured thereto.

*m′ m′* represent pistons, secured at their upper ends to the cross piece *b* and their lower ends formed in the block $m^2$.

S represents a spiral spring, secured round the bar *m*, as seen in Figs. 1 and 2, by which the pistons are forced up after the pressure from the lever C is removed.

The diaphragm E is furnished with openings *e′ e′*, and made to revolve on rollers $e^2$ $e^2$, secured to its bottom.

F is a vertical shaft, pivoted at its lower end in bottom of the tub A, and is secured to support B, and is provided with a ratchet-wheel, G, which is operated by a pawl, *g*, pivoted in the upper slotted end of the standard *g′*, secured to the side of support B.

$g^2$ is a bar, secured at one end to bar *g′*, and fastened at its opposite end to lever C. By these means the vertical shaft F may be moved, and thus motion given to the diaphragm E.

The operation of our machine is as follows: The clothes or articles to be washed being placed with a sufficient quantity of water to cleanse them into the tub, and the clothes resting on the diaphragm E, motion is then given to the lever C, which gives motion to the spring clothes-pounder and causes the diaphragm E to have a revolving motion, so as to subject the surface of the clothes to be washed to the action of the pounder, and thereby forces the water from the clothes through the perforations in the diaphragm E into the bottom of the bucket.

Having thus described our invention, what we claim as new, and desire to secure by Letters Patent, is—

1. The perforated diaphragm E, constructed and arranged substantially as described, in combination with the spring-pounder D, said pounder being provided with pumps or pistons, substantially as set forth.

2. In combination with the shaft F, ratchet G, pawl *g*, and lever C, the perforated diaphragm E and pounder D, substantially in the manner specified.

In testimony that we claim the foregoing as our own we affix our signatures in the presence of two witnesses.

VIRGIL W. BLANCHARD.
T. BAILEY.

Witnesses:
SHELDON SMITH,
R. R. SMITH.